US012615429B2

(12) United States Patent (10) Patent No.: US 12,615,429 B2
Shin (45) Date of Patent: Apr. 28, 2026

(54) WEBCAM

(71) Applicant: LG ELECTRONICS INC., Seoul (KR)

(72) Inventor: Donghyok Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 18/695,269

(22) PCT Filed: Mar. 30, 2022

(86) PCT No.: PCT/KR2022/004470
§ 371 (c)(1),
(2) Date: Mar. 25, 2024

(87) PCT Pub. No.: WO2023/063508
PCT Pub. Date: Apr. 20, 2023

(65) Prior Publication Data
US 2025/0150701 A1 May 8, 2025

(30) Foreign Application Priority Data
Oct. 15, 2021 (KR) ........................ 10-2021-0137248

(51) Int. Cl.
*H04N 23/57* (2023.01)
*H04N 23/51* (2023.01)

(52) U.S. Cl.
CPC ............. *H04N 23/57* (2023.01); *H04N 23/51* (2023.01)

(58) Field of Classification Search
CPC ........ F16M 11/06; G03B 17/02; G03B 17/56; G06F 1/16; H04N 23/00; H04N 23/51; H04N 23/57
See application file for complete search history.

(56) References Cited

U.S. PATENT DOCUMENTS 6,587,151 B1 * 7/2003 Cipolla ................. G06F 1/1656
D16/202
6,992,721 B1 * 1/2006 Kambayashi ......... G06F 1/1632
348/E5.026
(Continued)

FOREIGN PATENT DOCUMENTS

KR 20-0304972 2/2003
KR 10-0690908 3/2007

OTHER PUBLICATIONS

PCT International Application No. PCT/KR2022/004470, International Search Report dated Jul. 26, 2022, 7 pages.

*Primary Examiner* — Amy R Hsu
(74) *Attorney, Agent, or Firm* — LEE, HONG, DEGERMAN, KANG & WAIMEY

(57) ABSTRACT

A webcam comprises: a housing; a camera module positioned inside the housing; and a connection unit positioned at the lower part of the housing. The connection unit comprises: a contact module for connecting the camera module and a monitor; a first bracket coupled to the housing; a second bracket having the contact module fixed thereto; a hinge module for rotatably coupling the first bracket and the second bracket; and a fixation pin protruding to the outside of the housing. The webcam may be directly connected to the monitor and thus has the advantage of enabling the elimination of a cable for connecting to a main body.

8 Claims, 6 Drawing Sheets

(56)          References Cited

U.S. PATENT DOCUMENTS

| 7,061,536 | B2 * | 6/2006 | Cha | G06F 1/1637 |
|---|---|---|---|---|
| | | | | 348/376 |
| 11,334,115 | B2 * | 5/2022 | Wang | G06F 1/1686 |
| 11,681,329 | B2 * | 6/2023 | Wang | G06F 1/1686 |
| | | | | 361/679.55 |

* cited by examiner

WEBCAM

CROSS-REFERENCE TO RELATED APPLICATION(S)

This application is the National Stage filing under 35 U.S.C. 371 of International Application No. PCT/KR2022/004470, filed on Mar. 30, 2022, which claims the benefit of earlier filing date and right of priority to Korean Application No. 10-2021-0137248, filed on Oct. 15, 2021, the contents of which are all hereby incorporated by reference herein in their entireties.

TECHNICAL FIELD

The present disclosure relates to a webcam, and more particularly, to a webcam that is to be immediately used by being connected to a computer and has an adjustable angle.

BACKGROUND

With advent of a multimedia era, webcams have become common as a computer accessory. In particular, these days, creation and dissemination of multimedia such as user created content (UCC), discussion classes on online e-learning sites, and video conferences have become common, and a webcam (short for Worldwide Web Cammer) has been recognized as an essential component of a computer.

Generally, the webcam is located at the top of a monitor and is located to photograph the face of a user while looking at the monitor. A typical webcam has a separate clip for fixing the webcam to the top of the monitor and a separate cable for connecting the webcam to a computer body.

Recently, with the thickness of displays becoming thinner and the bezel-less trend, there is no space on a bezel to fix a webcam clip, making it difficult to fix the webcam clip and making it difficult to use existing webcams.

An additional cable is required to connect the webcam to the computer body, which not only makes installation cumbersome but also causes an exposed connection cable to look messy.

DISCLOSURE

Technical Problem

An embodiment of the present disclosure is to provide a webcam that is to be immediately used by being connected to a computer, has an adjustable angle, and is capable of capturing an image of an opposite side depending on a fastening direction.

Technical Solution

According to an embodiment, a webcam includes a housing, a camera module located inside the housing, and a connector located below the housing, wherein the connector includes a connection module configured to connect the camera module to a monitor, a first bracket coupled to the housing, a second bracket to which the connection module is fixed, a hinge module configured to pivotably couple the first bracket and the second bracket to each other, and a fixing pin protruding out of the housing.

The connection module may include a module case, a connector protruding from the module case and connected to the monitor, and a camera cable electrically connected to the connector and connected to the camera module.

The second bracket may further include a connector hole formed to allow the connector to pass therethrough.

The module case may further include a connector reinforcing portion surrounding a circumference of the connector, and the connector hole may have a size corresponding to a size of the connector reinforcing portion.

The housing may include an opening formed in a lower portion thereof, and the webcam may further include a connector cover configured to cover the second bracket and protruding out of the housing through the opening.

The hinge may pivot around an axis in a first direction, and the opening is larger than a size of the connector cover in a second direction perpendicular to the first direction.

The connector cover may include a first hole corresponding to the fixing pin, and a second hole corresponding to the connector.

A pair of fixing pins may be provided at both sides of the connector.

The camera module may operate based on that the monitor connected to the connection module is connected to a computer through a data transmission cable and may not operate based on that the monitor is connected to the computer through an image transmission cable.

Advantageous Effects

A webcam according to the present disclosure may be connected directly to a monitor, and thus a cable connected to a body may be advantageously omitted.

The webcam according to the present disclosure has an adjustable angle and has a clean design without a hinge module being exposed to the outside.

The webcam of the present disclosure may be installed on a monitor with a small bezel while a clip structure for mounting the web cam on the monitor is omitted.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
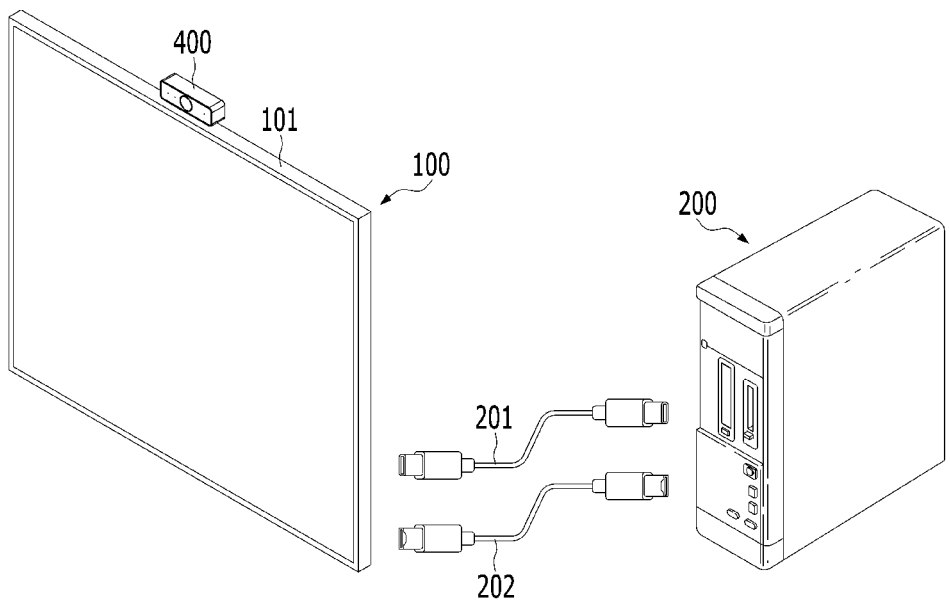
FIG. 1 is a diagram showing a webcam, a monitor, and a computer according to the present disclosure.

FIG. 1 is a diagram showing a webcam 400, a monitor 100, and a computer 200 according to the present disclosure. The monitor 100 may be a device connected to the computer 200 to output an image, and the computer 200 may be a stationary device such as a desktop and may be understood as a concept including the laptop computer 200, a digital broadcasting terminal, personal digital assistants (PDA), portable multimedia player (PMP), a navigation game, a slate PC, a tablet PC, an ultrabook, and a smart phone. That is, the computer 200 is a device including a CPU and a GPU that are capable of outputting an image through the monitor 100.

The monitor 100 may be connected to the computer 200 to receive and output image information, and the computer 200 may receive information such as the size and resolution of the monitor 100 from the monitor 100 and adjust the image to a suitable size to provide the image to the monitor 100. A method of connecting the monitor 100 to the computer 200 may include a D-SUB cable, a DVI cable, an HDMI cable, and a USB-C.

The D-SUB cable is also referred to as an RGB cable with a cable that has been developed by the IBM and used thus far. Data is transmitted and received in a non-digital analog manner. The D-SUB cable is an analog method, and thus compared to a recently used cable, image quality is deteriorated, noise is generated, and image quality is changed depending on the length of a cable, and accordingly the D-SUB cable is not used much these days. However, the D-SUB cable is still used in a main board for a user of the conventional monitor 100.

The DVI cable is a technology for compressing and transmitting digitized image information, and has less noise than an analog method and exchanges a large amount of data, thereby being used instead of the D-SUB. The DVI cable is released to overcome the limitations of the analog method as the LCD monitor 100 became popular, and there are limits to the resolution supported depending on the arrangement and number of pins.

The HDMI cable may be smaller than a conventional D-SUB cable or DVI cable, and may be used to connect the monitor 100 to a small device, such as a laptop or a game console, in addition to the computer 200. The HDMI cable is supported by most A/V devices and is widely used by replacing the DIV cable. The HDMI cable is an integrated cable for transmitting not only video but also sound.

However, to use the HDMI, patent fee is required, and to avoid this, a DP cable is also used. The DP cable is the standard digital display interface defined by the VESA and may transmit both video and sound, such as the HDMI. Rather, the HDMI has a larger transmission bandwidth than HDMI, and thus has been increasingly used.

Recently, a digital device is gradually miniaturized and used by connecting a smartphone and the monitor 100, and thus the size of a terminal for transmitting an image to a display becomes smaller. The USB-C is a 24-pin USB terminal system that allows data and power transfer. Upper and lower terminals are the same, and thus may be used regardless of an insertion direction, and the maximum transmission rate is 10 Gbps. Thunderbolt 3 having the same shape as the USB-C supports a data transmission rate of 40 Gbps and provides a video bandwidth of 1.4 times the HDMI transmitting video and audio signals.

Accordingly, the thunderbolt 3 may transmit a large amount of file and simultaneously supply power with output of 100 W as well as image information and sound information, and thus may be supported in most A/V devices. Accordingly, unlike the D-SUB cable, the DVI cable, and the HDMI cable, the USB-C type cable (including the provider bolt) has an advantage of transmitting data.

The webcam 400 is a camera mainly used for photographing the face of a user while using the computer 200, and is generally installed on the monitor 100 to simultaneously perform photography while viewing the monitor 100.

Typically, the webcam 400 may be fixed to an upper portion of the monitor 100 by using a clip, but may cover a screen when applied to the monitor 100 of a recent bezel-less model, and may increase in volume due to the clip. As the monitor 100 becomes thinner, it is difficult to fix the webcam 400 at a desired angle.

The conventional webcam 400 connects a separate USB cable to the computer 200 to use the separate USB cable, and there are problems with using the cables that get in the way, or in the case of laptops, there are not enough USB ports, and thus it is inconvenient in use.

In the case of the monitor 100 integrated with the webcam 400, there is a problem in that the size of a bezel increases above the monitor 100, and the camera is located in a direction toward a rear surface of the display, and thus the thickness of the monitor 100 becomes thick.

Accordingly, the webcam 400 of the present disclosure is implemented to be fastened through a coupling structure formed above the monitor 100, thereby overcoming the limitation of the clip type and preventing the bezel of the monitor 100 from increasing or thickening.

A connection port 101a may be formed in an upper portion 101 the monitor 100 rather than simply being physically fastened to an upper portion of the monitor 100, and thus image information acquired from the webcam 400 may be transmitted through the monitor 100, and power may be applied to the monitor 100.

Accordingly, the webcam 400 may not require a separate USB cable for connection with the computer 200, and thus has a small volume and convenient portability.

As described above, the webcam 400 driven under connection with the connection port 101*a* of the monitor 100 is applicable to the monitor 100 to which a USB-C type cable is applied for data transmission. When the monitor 100 is connected to the computer 200 by using a cable 201 for transmitting data, such as a USB-C type, the webcam 400 may operate, and when the monitor 100 is connected to a DVI cable or HDMI cable 202 for transmitting and receiving only image information, the webcam 400 may be deactivated.

A camera module 425 may be connected to the computer 200 through the monitor 100 without being directly connected to the computer 200, and thus may transmit image information acquired through the camera module 425, and a main board of the monitor 100 may include a USB hub function, and the webcam 400 may be connected to the main board of the monitor 100 to provide image information and receive power.

Figure 2:
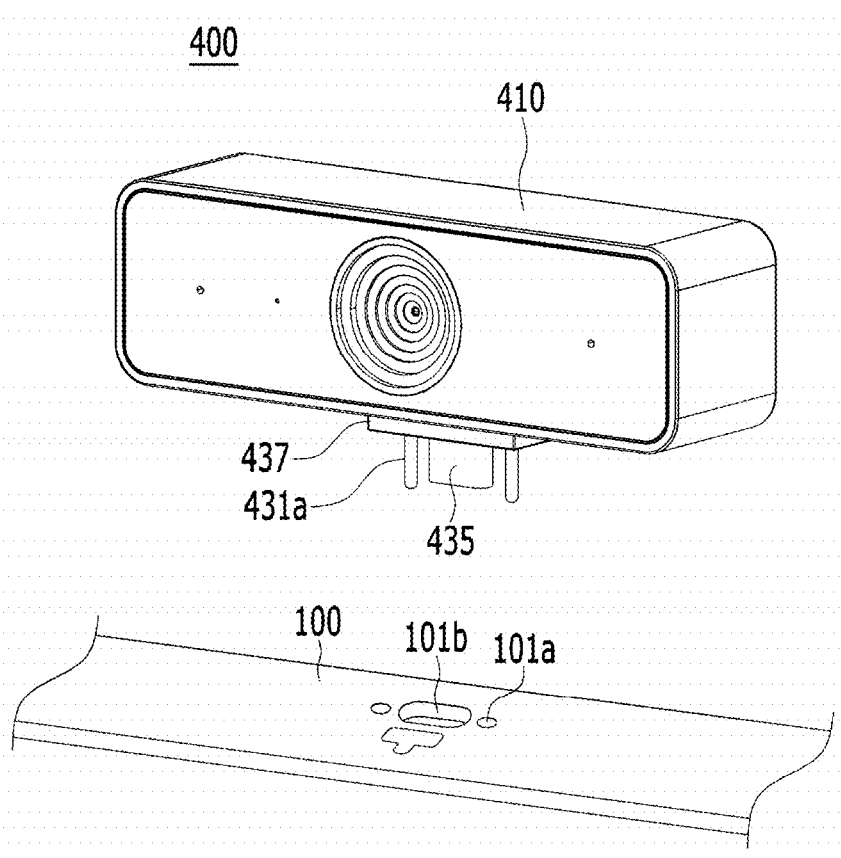
FIG. 2 is a front perspective view illustrating a state in which a web cam according to the present disclosure is separated from a monitor.

FIG. 2 is a front perspective view illustrating a state in which the web cam 400 according to the present disclosure is separated from the monitor 100. The monitor 100 may include a connection port 101*a* and a fixing groove 101*b* coupled to an upper portion of the webcam 400.

The connection port 101*a* may be connected to the connector 435 of the webcam 400 to supply power to the webcam 400, receive data from the webcam 400, and transmit the data to the computer 200. The connector 435 may be damaged by an impact during fastening only with the connector 435, and thus the webcam 400 may be stably fastened to the monitor 100, and at the same time, a fixing pin 432*a* having rigidity to protect the connector 435 may be further provided. A pair of fixing pins 432*a* may be provided at both sides of the connector 435 to protect the connector 435, and a fixing groove may be formed at a position corresponding to the fixing pin 432*a* in the upper portion of the monitor 100.

The connector 435 may have a USB-C type, and thus, a product other than the webcam 400 may be connected to transmit and receive data through the monitor 100. For example, a speaker may be directly used without a separate cable by coupling the speaker, and a monitor may be additionally connected to an upper portion of the monitor 100 implement the dual monitor 100.

Figure 3:
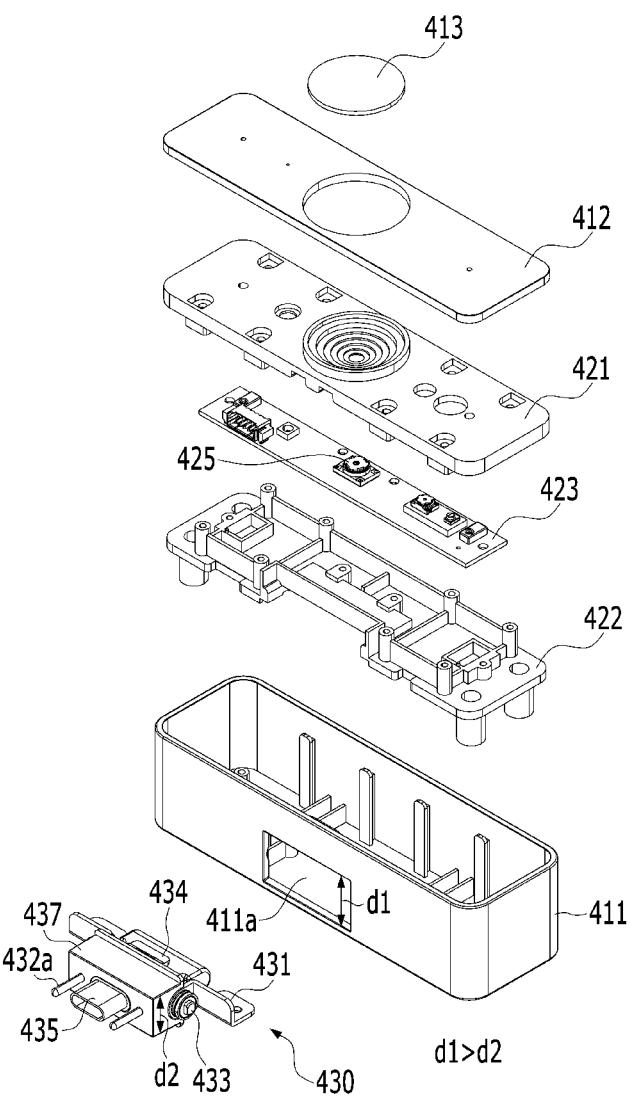
FIG. 3 is an exploded perspective view of a webcam according to the present disclosure.

FIG. 3 is an exploded perspective view of the webcam 400 according to the present disclosure, and the present disclosure will be described in more detail with reference to the exploded perspective view.

The webcam 400 may include a housing 410, the camera module 425 located inside the housing 410, and a connector 430 located below the camera module 425 and coupled to the monitor 100.

The housing 410 may define an outer appearance, and in the present embodiment, the housing 410 may include a box-shaped rear housing 411 having an open front surface and a front housing 412 covering the front surface. The front housing 412 may include a lens cover 413 made of a transparent material to supply light to the camera module 425.

The camera module 425 may be formed on a substrate 423, and the substrate 423 may include a connection terminal provided at one side to which a camera cable 436 connected to a fastening portion is connected. To prevent the camera module 425 from being shaken, the camera module 425 needs to be fixed into the housing 410 to prevent an image from being shaken, and thus to fix the substrate 423 on which the camera module 425 is mounted, a pair of frames 421 and 422 may be located on a front surface and a rear surface of the substrate 423.

The connector 430 may be assembled to the rear housing 411, the second frame 422, the substrate 423, and the first frame 421 may be stacked in the stated order, and then fixed to the rear housing 411 by using a screw or the like. Then, the web cam 400 may be completed by coupling the front housing 412.

The rear housing 411 may include an opening to partially expose the connection portion 430 through a lower portion, and the size of the opening may be slightly larger than the size of the fastening portion. In more detail, the fastening part of the present disclosure may include a hinge to pivot the housing 410 in one direction (forward and backward direction) with respect to the monitor 100, and a size d1 of the opening in a vertical direction (forward and backward direction) perpendicular to a hinge shaft (horizontal direction) may be larger than a size d2 of the fastening portion to pivot the hinge.

Figure 4:
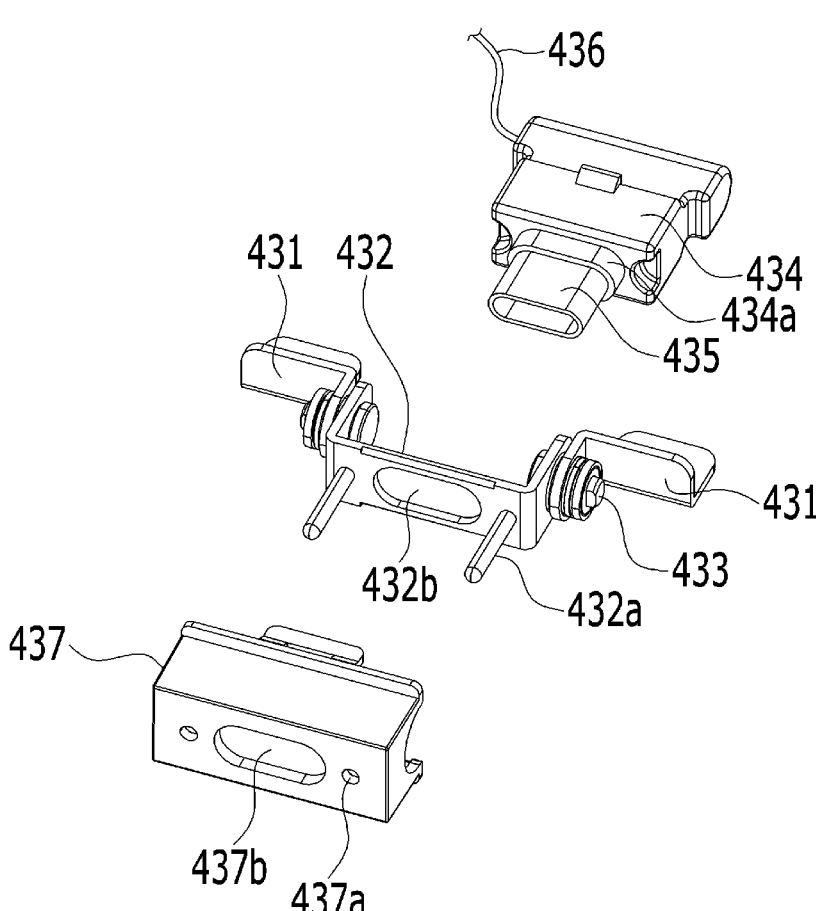
FIG. 4 is an exploded view of a connector of a webcam according to the present disclosure.
Figure 5:
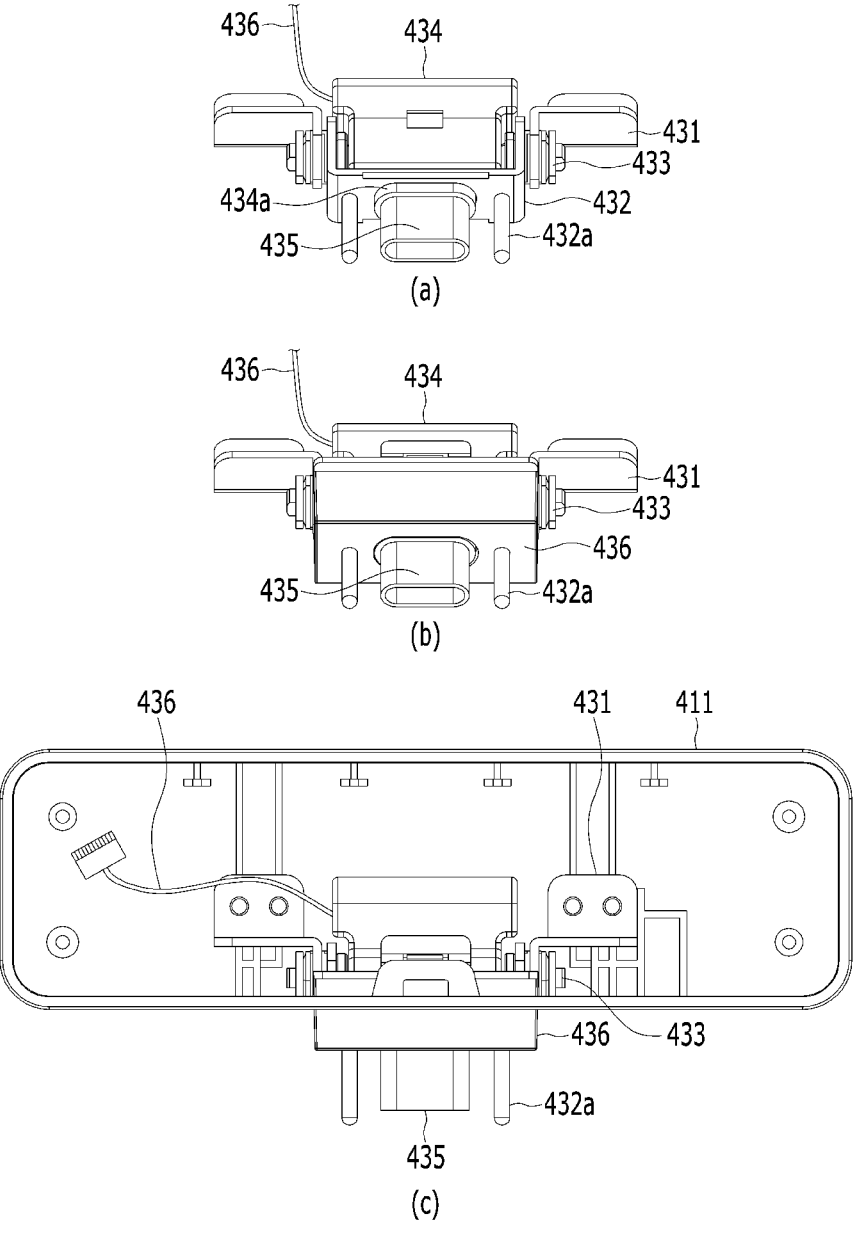
FIG. 5 is a diagram showing an assembly sequence of a connector of a webcam according to the present disclosure.

FIG. 4 is an exploded view of the connector 430 of the webcam 400 according to the present disclosure, and FIG. 5 is a diagram showing an assembly sequence of the connector 430 of the webcam 400 according to the present disclosure. Hereinafter, with reference to FIGS. 4 and 5, the connector 430 will be described in more detail.

The connector 430 may include a first bracket 431, a second bracket 432, a hinge module 433, a connection module, and a connector cover 437.

The first bracket 431 and the second bracket 432 may be pivotably coupled to each other through the hinge module 433. The first bracket 431 may be fixed to the housing 410, and an connection module and the connector cover 437 fixed to the second bracket 432 may be fixed to the monitor 100 and an angle between the connection module and the connector cover 437 may be varied through the hinge module 433.

The first bracket 431 may be provided with a fastening hole into which a screw or the like is to be inserted to fasten the first bracket 431 to the rear housing 411, and the second bracket 432 may be concavely formed in a U-shape to allow the connection module to be accommodated thereon. The left and right sides of the U-shape may be hinged to the first bracket 431, and a connector hole 432*b* through which connector 435 passes may be formed at a lower portion of the U-shape.

The second bracket 432 may be formed with a fixing pin 432*a* for physically coupling the second bracket 432 to the monitor 100, and the first bracket 431, the second bracket 432, and the fixing pin 432*a* may be made of a metal material to ensure rigidity.

As shown in FIG. 5A, the connection module may include a block-shaped module case 434 to be inserted into the concave portion of the second bracket 432, and the connector 435 may protrude from a lower portion of the module case 434. The camera cable 436 connected to the connector 435 may extend to be connected to a terminal of the substrate 423 described above.

To prevent the connector 435 from being broken, the module case 434 may further include a connector reinforcing portion 434*a* surrounding a circumference of the connector 435, and the connector hole 432*b* of the second bracket 432 may have a size in which the connector reinforcing portion 434a is to be inserted, and as illustrated in (a) of FIG. 5, the connector reinforcing portion 434a may protrude through the connector hole 432b.

The connection module may further include the connector 435 exposed to a lower portion of the second bracket 432 and the connector cover 437 to allow the fixing pin 432a to be exposed to the outside and prevent a bracket from being exposed. The connector cover 437 may cover the second bracket 432 as shown in (b) of FIG. 5, and may include a first hole 437a through which the fixing pin 432a passes to expose the connector 435 and the fixing pin 432a therethrough, and a second hole 437b through which the connector 435 passes.

The fixing pin 432a is located at the left and right sides of the connector 435, and thus the first hole 437a may be located at the left and right sides of the second hole 437b. When the connector 435 is in direct contact with the second hole 437b, the connector 435 may be damaged, and thus the connector reinforcing portion 434a may be inserted into the second hole 437b.

The assembled connector 430 is inserted into the rear housing 411 and fitted into an opening to expose the connector 435, the fixing pin 432a, and the connector cover 437 therethrough. After the first fastening portion is fixed to the rear housing 411 through a fastening portion such as a screw, the frames 421 and 422 and the substrate 423 may be coupled in the order described above to assemble the webcam 400.

Figure 6:
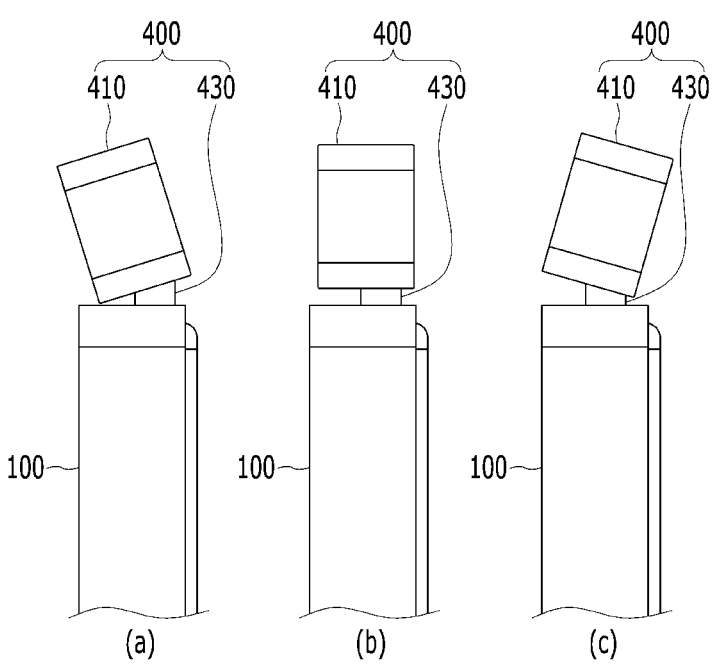
FIG. 6 is a diagram showing a method of adjusting an angle of a webcam according to the present disclosure.

FIG. 6 is a diagram showing a method of adjusting an angle of the webcam 400 according to the present disclosure. As described above, the connector 430 may be fixed to the monitor 100, and thus an angle between the housing 410 and the camera module 425 mounted thereon may be adjusted. As shown in (a) to (c) of FIG. 6, the user may change an angle of a camera downward and upward The USB-C type has the same front and rear directions, and thus an opposite side of the monitor 100 may be photographed when the webcam 400 is inserted into the opposite side.

As described above, the webcam 400 according to the present disclosure may be directly connected to the monitor 100, and thus a cable connected to the main body may be omitted.

The webcam 400 according to the present disclosure may have an adjustable angle, and the hinge module 433 may not be exposed to the outside and has a clean design.

The webcam 400 according to the present disclosure may also be installed the monitor 100 with a small bezel while a clip structure for mounting the webcam 400 on the monitor 100 is omitted.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A webcam comprising:
a housing;
a camera module located inside the housing; and
a connector located below the housing,
wherein the connector includes:
a connection module configured to connect the camera module to a monitor;
a first bracket coupled to the housing;
a second bracket shaped to define a connector hole and to which the connection module is fixed;
a hinge module configured to pivotably couple the first bracket and the second bracket to each other; and
a fixing pin protruding out of the housing,
wherein the connection module includes:
a module case;
a connector protruding from the module case and configured to connect to the monitor through the connector hole; and
a camera cable electrically connected to the connector and connected to the camera module.

2. The webcam of claim 1, wherein the module case further includes a connector reinforcing portion surrounding a circumference of the connector, and
the connector hole has a size corresponding to a size of the connector reinforcing portion.

3. The webcam of claim 2, wherein the housing includes an opening formed in a lower portion thereof, and
the webcam further includes a connector cover configured to cover the second bracket and protruding out of the housing through the opening.

4. The webcam of claim 3, wherein the hinge module pivots around an axis in a first direction, and
the opening is larger than a size of the connector cover in a second direction perpendicular to the first direction.

5. The webcam of claim 3, wherein the connector cover is shaped to include:
a first hole corresponding to the fixing pin; and
a second hole corresponding to the connector.

6. The webcam of claim 1, wherein a pair of fixing pins are provided at both sides of the connector.

7. The webcam of claim 1, wherein the camera module operates based on that the monitor connected to the connection module is connected to a computer through a data transmission cable and does not operate based on that the monitor is connected to the computer through an image transmission cable.

8. A webcam comprising:
a housing;
a camera module located inside the housing; and
a connector located below the housing,
wherein the connector includes:
a first bracket coupled to the housing;
a second bracket;
a hinge module configured to pivotably couple the first bracket and the second bracket to each other;
a connection module protruding below from the second bracket and configured to connect to a monitor; and
a camera cable electrically connected to the connector and connected to the camera module,
wherein the connector is fixed to the monitor with the second hinge bracket, and
wherein the housing and the camera module rotate with the first bracket.

* * * * *